United States Patent [19]

Patzschke et al.

[11] 4,364,860

[45] Dec. 21, 1982

[54] CATHODICALLY DEPOSITABLE AQUEOUS ELECTRO-DIPPING LACQUER COATING COMPOSITION

[75] Inventors: Hans-Peter Patzschke; Armin Gobel, both of Wuppertal, Fed. Rep. of Germany

[73] Assignee: Herberts Gesellschaft mit beschrankter Haftung, Wuppertal, Fed. Rep. of Germany

[21] Appl. No.: 164,952

[22] Filed: Jul. 1, 1980

Related U.S. Application Data

[62] Division of Ser. No. 18,004, Mar. 7, 1979, Pat. No. 4,252,703.

[30] Foreign Application Priority Data

Mar. 13, 1978 [AT] Austria ................................ 1766/78

[51] Int. Cl.³ ........................ C08L 75/12; C08L 63/02
[52] U.S. Cl. ................................ 525/127; 204/181 C; 524/901; 525/153; 525/454
[58] Field of Search ................ 260/29.2 TN, 29.2 EP, 260/29.2 N, 29.6 NR, 29.2 UA, 18 EP; 204/181 C

[56] References Cited

U.S. PATENT DOCUMENTS

| | | | |
|---|---|---|---|
| 3,337,533 | 8/1967 | Ham | 260/239 |
| 3,391,097 | 7/1968 | Williamson | 260/18 |
| 3,480,601 | 4/1969 | Ashby et al. | 260/86.1 |
| 3,523,925 | 8/1970 | Kamal et al. | 260/77.5 |
| 4,031,050 | 6/1977 | Jerabek | 260/29.2 TN |
| 4,037,018 | 7/1977 | McGinniss | 260/29.2 TN |
| 4,139,510 | 2/1979 | Anderson | 525/533 |

*Primary Examiner*—Theodore E. Pertilla
*Attorney, Agent, or Firm*—Schwartz, Jeffery, Schwaab, Mack, Blumenthal & Koch

[57] ABSTRACT

A cathodically depositable aqueous electro-dipping lacquer coating which contain as binder, which binder can be diluted with water by protonization with acids, 55 to 95% by weight based on the total quantity of binder, of organic synthetic resin binders containing amino groups, having an average molecular weight ($\overline{M}n$) of about 500 to 10,000, a $pK_b$ value of about 3 to 7 and an amine value of about 30 to 150 and 45 to 5% by weight of cross-linking agents having an average molecular weight ($\overline{M}n$) of about 500 to 5,000, which contain esterified terminal carboxyl groups.

16 Claims, No Drawings

CATHODICALLY DEPOSITABLE AQUEOUS ELECTRO-DIPPING LACQUER COATING COMPOSITION

This is a division, of application Ser. No. 018,004, filed Mar. 7, 1979, now U.S. Pat. No. 4,252,703.

The present invention relates to a cathodically depositable aqueous electro-dipping lacquer coating composition.

The preparation of coatings by electro deposition of film-forming materials on electrically conductive metal bodies under the influence of an applied voltage is known, and is being used more and more widely in the art for economic reasons. The resins used in this process consist mainly of binders containing carboxyl grops such as alkyd resins, acrylic resins, maleinate oils, maleinate epoxy resin esters or maleinate butadiene oils which are made water-soluble by salt formation with bases and are deposited at the anode by the applied electric current. This process has the disadvantage, however, that nascent oxygen is continuously formed at the anode at the deposition voltage used during the electro deposition, and this can change the coagulated resins by oxidation in a disadvantageous manner, and that metal ions dissolve and cause strong discolouration or even fleck formation in the coatings during stoving and thereby adversely affect water-repellency by salt formation.

Cathodically depositable resins are used to overcome the above disadvantages. Thus, oxygen develops at the cathode, and metal ions dissolve at an almost neutral pH value only at the beginning of the electrical coating process. The water solubility is obtained in this process by introducing tertiary amino groups into the resin structure and then by forming salts with acids (cf. H. Verdino: J. Oil Col. Chem. Assoc. 59 (1976), 81–85, and German Offenlegungsschrift No. 27 28 470). However, the amino groups, which are firmly bonded in the resin, remain in the film during stoving and influence the properties thereof in a disadvantageous way as hydrophilic interruptions. Thus, an increase in the amine value impairs the corrosion protection, although such an increase is desirable for improving the solubility at a neutral pH value. This problem is solved in German Auslegeschrift No. 22 52 536 and German Offenlegungsschrift No. 22 65 195 by the thermal cross-linking of hydroxyl groups and resins containing small proportions of primary amino groups with blocked polyisocyanates, with the subsequent cleavage of the protective groups, for example, phenols. The tertiary amino groups providing solubility are thermally split off at least in part by β-elimination from the resins in German Offenlegungsschriftton Nos. 23 63 074 and 27 53 861. This process has the disadvantage of contamination of the outgoing air by the large quantity of eliminated protective groups and amines.

The object of the present invention is substantially to avoid the known disadvantages. It has now been found that this object can surprisingly be achieved by using coating compositions containing the binders defined below.

The present invention therefore provides a cathodically depositable aqueous electro-dipping coating composition comprising a binder dilutable in water by protonization with acids, said binder consisting essentially of:

(A) 55 to 95% by weight, based on the total weight of binder of an organic synthetic resin binder having an average molecular weight (Mn) of about 500 to about 10,000, a $pK_b$ value of about 3 to about 7, and containing amino groups selected from the group consisting of primary, secondary and tertiary amino groups to an amine value of about 30 to about 150; and (B) 45 to 5% by weight, based on the total weight of the binder, of a cross-linking agent having an average molecular weight (Mn) of about 500 to about 5,000 and containing terminal carboxyl groups, a sufficient number of which are esterified wit monoalcohols containing from 1 to 6 carbon atoms to prevent the cross-linking agent from travelling to the anode during electrodeposition and to provide the crosslinking agent with an ester value of about 30 to about 350, the ester groups being substantially stable in a neutral aqueous medium but being reactive in a basic medium at a temperature above 140° C. with amino groups selected from the group consisting of primary and secondary amino groups which are present in the organic synthetic resin binder. The $pK_b$ value preferably amounts to 3 to 5.5 particularly preferably 3.5 to 6. The temperature mentioned under B preferably lies above about 160° C.

As the deposited binders are stoved, the ester groups in component B react with the primary and/or secondary amino groups in component A to form an amide, the basic primary and/or secondary amino groups thereby loosing their disturbing basic character in the film. The reaction takes place in principle according to the following reaction scheme:

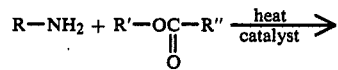

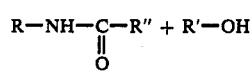

After the above reaction no amines are eliminated during stoving and furthermore, the cleavage products are obtained only in amounts below about 8% by weight, preferably below 5% by weight due to the low molecular weight of the alcohol produced. Firmly adhering coatings, which have a very high resistance to alkalis and to salt spray mist after stoving and which attract particular attention even without corrosion inhibitors on unbonded sheets of iron, form on the cathode.

The component A containing reactive primary and/or secondary amino groups is produced so that it has an average molecular weight (Mn) of from about 500 to 10,000 preferably of from about 800 to 8,000, particularly preferably from about 800 to 5,000. In order to obtain suitable water-solubility, it is necessary for component A to have an amine value of from about 30 to 150, preferably from about 60 to 130, particularly preferably from about 80 to 120. The proportion of primary and secondary amino groups should be at least about ⅓ of the total value, i.e. the amine value should lie above 30, preferably above 50. It is desirable to keep the proportion of tertiary amine groups present in the molecule as small as possible, and to keep the proportion of secondary or particularly advantageously primary amino groups as high as possible.

Primary and/or secondary amino groups are preferably introduced into the resin base, in order to produce component A, by reacting resins containing at least one, preferably at least two 1,2-epoxy groups or isocyanate groups per molecule with a ketimine and/or a polyamine containing amino and/or hydroxyl groups. Resins containing 1,2-epoxy groups have proved particularly suitable for this reaction and are prepared by:

(a) introducing glycidyl groups by means of, for example, epichlorhydrin:
  (i) in OH—functional resins (e.g. polyglycidyl ether and epoxy Novolaks)
  (ii) in COOH—functional resins (e.g. polyglycidyl ester), or
  (iii) in NH$_2$—functional resins (e.g. polyglycidyl amines);

(b) polymerisation of glycidyl(meth)acrylate onto a suitable monomer mixture of, for example, styrene and/or (meth) acrylic acid esters of different chain lengths and/or hydroxy alkyl (meth) acrylates.

It is particularly preferred according to (a) above for the resins containing epoxy groups to be polyglycidyl ethers corresponding to the general formula:

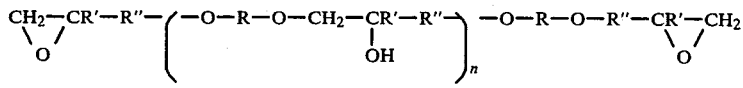

wherein

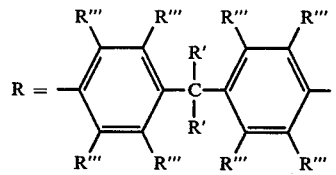

R′=Hydrogen or —C$_n$H$_{2n+1}$,
R″=—(CR′$_2$)$_n$—
R‴=—R′ or halogen, preferably hydrogen, and n=0 to 3;

and which have an average molecular weight (Mn) of from about 340 to 2,000 and an epoxy equivalent weight of from about 170 to 1500. These particular resins can also be used in hydrated form. In order to control the properties of the film obtained therefrom, it is often necessary to react a proportion of the reactive groups in the epoxy resin with a modifying material. Suitable modifying materials are:

(I) compounds containing carboxyl groups such as saturated or unsaturated monocarboxylic acids (for example, benzoic acid, linseed oil fatty acid, 2-ethylhexanic acid, and versatic acid), aliphatic, cycloaliphatic and/or aromatic dicarboxylic acids of varying chain length (for example, adipic acid, sebacic acid, isophthalic acid and dimeric fatty acids), hydroxy alkyl carboxylic acids (for example, lactic acid and dimethylol propionic acid) as well as polyesters containing carboxyl groups;

(II) compounds containing amino groups such as diethyl amine or ethyl hexylamine, diamines with secondary amino groups, for example, N,N′-dialkylalkylene diamines such as dimethyl ethylene diamine, N,N′-dialkylpolyoxyalkylene amines such as N,N′-dimethyl-polyoxy propylene diamine, cyanalkylated alkylene diamines such as bis-N,N′-cyanethylethylene diamine, cyanalkylated polyoxy alkylene amines such as bis-N,N′-cyanethyl polyoxy propylene diamine, polyamino amides such as versamides or the reaction product of 1 mole diamino hexane with 2 moles monoglycidyl ether or monoglycidyl ester, specifically glycidyl esters of α-branched fatty acids such as versatic acid;

(III) compounds containing hydroxyl groups such as neopentyl glycol, bis-ethoxylated neopentyl glycol, hydroxy pivalinic acid neopentyl glycol ester, dimethyl hydantoin-N,N′-diethanol, hexane diol-1,6, hexane diol-2,5, 1,4-bis-(hydroxy methyl) -cyclohexane, 1,1-isopropylidene-bis-(p-phenoxy)-2-propanol, trimethylol propane, pentaerythrite or amino alcohols such as triethyanolamine, methyl diethanolamine or alkyl ketimines containing hydroxyl groups such as aminomethyl propane diol-1,3-methyl-isobutyl-ketimine or tris-(hydroxymethyl)-aminomethane-cyclohexanone ketimine, as well as polyglycol ethers, polyesters polyols, polyether polyols, polycaprolactone polyols, and polycaprolactam polyols of different functionality and molecular weights; and (IV) saturated or unsaturated fatty acid methyl esters the ester radicals of which are interchanged in the presence of sodium methylate with hydroxyl groups of the epoxy resins (German Patent No. 943 494).

Secondary hydroxyl groups are formed on the epoxy resin by the reaction of polyglycidyl ethers based on bis-phenol, with alkyl ketimines containing amino and/or hydroxyl groups. If primary hydroxyl groups are to be present, it is either necessary to carry out the reaction with amino alcohols or else to produce the corresponding hydroxyl group by hydrolytic splitting of the corresponding esters. The low molecular monocarboxylic acid, for example lactic acid, used primarily for esterification, is also used as a neutralisation agent after hydrolysis.

Epoxy polyglycidyl ethers can not only be produced on the basis of bisphenol A but can also contain other components such as triglycidyl isocyanurate, heterocyclic diglycidyl compounds (German Offenlegungsschrift No. 18 16 095) or substituted hydantoins (U.S. Pat. No. 3,391,097).

It is preferable for the resins containing epoxy groups to be glycidyl(meth)acrylate-copolymers having an average molecular weight (Mn) of from about 800 to 8000 and an epoxy equivalent weight of from about 800 to 3000, and which have been obtained by copolymerisation of glycidyl(meth)acrylate with unsaturated monomers. Suitable unsaturated monomers include, for example, styrene, vinyl toluene, and (meth)acrylic acid esters of different chain length. The methacrylic acid esters preferably contain C$_1$ to C$_4$-alcohol moieties and the acrylic acid esters preferably contain C$_2$ to C$_8$ alcohols moieties.

Monomers containing hydroxyl groups such as hydroxy alkyl(meth) acrylic acid esters, for example 2-hydroxypropyl methacrylate, 1,4-butane diol acrylate or hydroxy ethyl acrylate or etherified methylol derivatives of (meth)acrylamide can optionally be used as additional components. The mixed polymerisation generally takes place in organic solvents such as alcohols or glycol ethers at about 60° to 145° C. with the addition of radical initiators such as peroxides, hydroperoxides, peresters or thermally cleavable azo compounds. When selecting the molar ratios of the components used, care should be taken to ensure that no unreacted lower molecular weight amine remains in the mixture, because aperture-like disturbances in the surface can then occur during electrophoretic deposition.

The reaction conditions (e.g. reaction temperature and selection of solvents) must be controlled in such a way that no substances which are capable of destroying the ketimine bond, such as water, remain present in the reaction product. Linear, branched or cyclic alkyl ketimines are used as the ketimines, for example, products having the following structures;

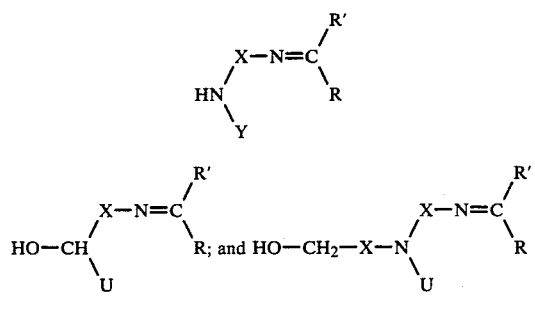

in which
$X = -(CR_2)_n-$;
$R = -H$, or $-R'$,
$R' = -C_mH_{2m+1}$, or $-C_6H_{11}$,
$U = -R$, or $-Y$,

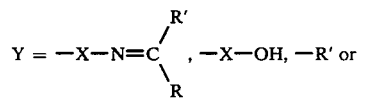

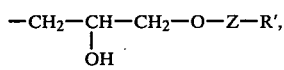

$Z = >CO$, or $-X$
$n = 1$ to 6; and
$m = 1$ to 12

The ketimines are produced by known methods by elimination of water from the corresponding polyamines havng the general structure $R-NH-R-NH_2$ or the corresponding amino alcohols having the general structure $HO-R-NH_2$ and the suitable aliphatic ketones such as diethyl ketone, methyl isobutyl ketone, ethyl-n-propyl ketone, or also cyclopentanone, cyclohexanone, acetophenone etc. In order to simplify the formation of ketimines, ketones which ensure in a simple way that the reaction water is circulated out and the substituents of which cause as little steric hindrance as possible are preferred. Diethylene triamine, N-methylethylenediamine, N-methylpropylene diamine, N-aminoethyl-piperazine and also the reaction product of 1 mole of 2,2-diemthylpropane-1,3-diamine with 1 mole of glycidyl ester of versatic acid are preferably used as amines and 2-aminoethanol, 1-aminopropanol-2, 1-aminopropanol-3, 2-amino-2-methylpropanol-1, 3-amino-2,2-dimethylpropanol-1, 1,5-diaminopentanol-3 or N-[2-aminoethyl]-N-[2-hydroxyethyl]-ethylene diamine are preferably used as amino alcohols.

The primary amino group is protected by the formation of ketimines (cf. U.S. Pat. No. 3,523,925) in such a way that it can be reacted over another functional group, for example, a secondary amino group or a hydroxyl group, without difficulties, with the epoxy base resin to form component A. The selection of the molar ratios of the components used must ensure that no unreacted low molecular amine remains in the mixture, because aperture-like disturbances in the surface would otherwise occur during electrophoretic coating. The reaction of the secondary amino group of the polyamino ketimine with the epoxy group begins at room temperature and is generally exothermic. In order to obtain a complete reaction, it is generally necessary to raise the temperature periodically to from 50° to 120° C.

The reaction of the ketimines containing hydroxyl groups with epoxy groups takes place in approximately the same temperature range with addition of basic catalysts such as tertiary amines, for example N,N'-dimethyl-benzyl amine, or Friedel-Crafts catalysts such as boron fluoride or tin(II)chloride. The reaction conditions (temperature, selection of the solvent and water-free operation) are selected in such a manner as to avoid splitting of the ketimine group. In order to prepare products having a low viscosity, it is often worth taking the ketimine solution and slowly adding the base resin thereto.

Polymers containing isocyanate groups which consist of aromatic, aliphatic and/or cycloaliphatic base skeletons with at least two isocyanate groups per molecule are also suitable for the reaction with ketimines containing amino groups. Typical examples thereof include the isomers or isomer mixtures of toluylene diisocyanate, 4,4'-diphenylmethane-diisocyanate as well as their hydration products such as dicyclohexylmethane diisocyanate. Hexane-1,6-diisocyanate, 1,6-diisocyanato-2,2,4-trimethyl hexane and 1-isocyanato-methyl-3-isocyanato-1,5,5-trimethylcyclohexane are also usable. Higher functional polyisocyanates which are formed by trimerisation, or reaction with water, trimethylol propane or polyols containing amino groups or ketimine groups are particularly preferred. Suitable isocyanate-containing prepolymers are prepared by the reaction of polyglycol ethers, polyester polyols, polyether polyols, polycaprolactone polyols, polycaprolactam polyols, or polyamino amides with excess polyisocyanates at temperatures of from about 30° to 100° C., optionally with the addition of catalysts such as dibutyl tin dilaurate or tertiary amines.

Another known method of producing resins with primary and/or secondary amino groups involves reaction with lower aliphatic, linear or branched $C_2$ to $C_6$ alkylene diamines or polyalkylene diamines. These compounds are particularly suitable if the reaction temperature needed for the addition, esterification, or ester interchange has to be so high that the ketimines decompose, or if other disturbing secondary reactions prevent the use of ketimines.

Thus, resins containing epoxy groups from polyhydrocarbons containing olefinic double bonds and with an average molecular weight (Mn) of from 750 to 6000 and an epoxy equivalent weight of from 500 to 2000 are reacted with excess ethylene diamine or diethylene triamine at temperatures of from about 120° to 200° C. Hydrocarbon radicals containing olefinic double bonds include, for example, polybutadiene oils of differing steric configurations, and copolymers of butadiene with other unsaturated monomers such as styrene or liquid polypentadiene. They are epoxidized by reaction with peracids such as performic acid or peracetic acid.

On the other hand, the more reactive polyglycidyl ethers based on bisphenol A react even at room temperature. In order to prevent gelation, from 1.1 to 8 moles of polyamine, preferably from 1.2 to 6 moles of polyamine excess is used per epoxy equivalent and, in addition, the epoxy resin solution is stirred slowly into the polyamine present. The excess amine has then to be distilled over very carefully under vacuum, and in the absence of oxygen. It can then be used again in the next mixture.

The polyisocyanate resins described above can also be reacted in the same way with polyamines to form ureas containing amino groups.

Polyamino amines are produced from lower aliphatic linear or branched polyamines and/or amino alcohols, optionally mixed with polyalcohols, or mixtures thereof with polybasic carboxylic acids and/or their anhydrides. Suitable lower aliphatic polyamines and/or amino alcohols, and which are preferably used in a stoichiometric excess include, for example, lower aliphatic polyamines such as ethylene diamine or diethylene triamine or amino alcohols or mixtures thereof with polybasic acids such as dimerized fatty acids, optionally with addition of suitable lower molecular weight polyols such as neopentyl glycol or polyglycol ethers, or higher polymeric polyols such as polyester polyols, polyether polyols and polycaprolactone polyols. Suitable amine values within the molecular weight range are determined by adding suitable chainbreaking agents such as saturated or unsaturated monocarboxylic acids, monoalcohols or monoamines. Condensation usually takes place in the melt or as an azeotropic condensation at temperatures of from about 150° to 250° C. Similar products are produced commercially under the trade names Beckopox, Versamid and Merginamid.

Polyamino amides of this type can also be produced by ester interchange of condensation resins containing ester groups with polyamines and also alkyl ketimines containing amino groups, with the elimination of low-boiling alcohols such as methanol or ethanol, and possibly in the presence of ester interchange catalysts.

Another method of producing component A involves the reaction with lower alkylene imines or substituted aziridines. Thus, the literature describes:

(1) the addition of ethylene imine to copolymers containing carboxyl groups with ring opening (German Offenlegungsschrift No. 15 95 056);

(2) the addition of N-(hydroxy alkyl)-ethylene imine to the polyisocyanates without ring opening of a (U.S. Pat. No. 3,337,533); and (3) the polymerisation of 2-(1-aziridinyl)-alkyl(meth)-acrylates (U.S. Pat. No. 3,480,601).

The ethylene imine rings in the resin are opened in a second stage of the reaction by means of a polymer-like reaction with lower molecular weight proton-active compounds such as phenols, monoamines or monocarboxylic acids. Resins containing amino groups which are capable of thermal cross-linking with component B are invariably formed in the process. α,β-unsaturated mono and/or dicarboxylic acids, their esters of different chain lengths with mono alcohols as well as styrene or vinyl toluene are used as comonomers. Ethylene imine reacts with acrylate resins containing carboxyl groups at a temperature ranging from about 50° to 150° C. and the quantity of alkylene imine is calculated stoichiometrically from the number of carboxyl groups to be reacted.

Resins of component A containing amino groups can also easily be obtained in a different way by the catalytic hydroation of copolymers containing (methacrylonitrile or possibly also (meth)acrylamide which has been introduced by polymerisation.

The cross-linking agent (component B) is a resin having terminal, esterified carboxyl groups which ester groups are substantially stable in a neutral aqueous medium but which react with the synthetic resin binder containing primary and/or secondary amino groups (component A) in the basic medium of the deposited film at temperatures above about 140° C. Substantially all terminal carboxyl groups should be esterified with alcohols which have a boiling point below 180° C., preferably below 140° C. In order to prevent component B from travelling to the anode, care should be taken to esterify at least 80, preferably at least 90, and particarly preferably at least 95 equivalent % of the terminal carboxyl groups. The reactivity of the esters is increased by the use of primary alcohols such as methanol or ethanol for esterification, and by raising the electrophilic activity of the carboxyl groups using suitable substituents. The incorporation of methyl and/or ethyl esters of lactic acid and of monomethyl and/or monoethyl succinic acid esters has proven particularly beneficial. The number of ester groups present preferably corresponds to an ester value of from 100 to 250, particularly preferably from 70 to 180. This denotes the amount in mg of KOH which is equivalent to the amount of alcohol contained in 1 g of solid substance, and which can be eliminated by amide interchange during the thermal cross-linking reaction. In order to promote compatibility, component B should have an amine value of from 0 to 100, preferably of from 0 to 60. The lower limit more preferably lies at 10, most preferably at 20, and the upper limit preferably lies at 50. This value should, however, be as low as necessary for stability. It has been found to be advantageous if the amino group present is of a primary or secondary one. The average molecular weight (Mn) of component B is preferably from about 500 to 3000.

Cross-linking agents of the above type can be produced in various ways, for example by:

(a) esterification of maleinated unsaturated hydrocarbons, oils or fatty acid epoxy esters;

(b) ester interchange of resins containing hydroxyl groups with saturated or unsaturated dicarboxylic acid esters; and (c) polycondensation using hydroxy alkyl carboxylic acid esters or dicarboxylic acid mono alkyl esters.

Because of the careful reaction conditions and the associated slight yellowing of the product, the addition of either hydroxy and/or amino alkyl carboxylic acid esters or else dicarboxylic acid monoalkyl esters to resins with isocyanate or epoxy groups has proven to be a particularly useful method of synthesis.

The addition of hydroxy and/or amino alkyl carboxylic acid esters to aliphatic, cycloaliphatic and/or aromatic polyisocyanates having at least two isocyanate groups per molecule is particularly preferred. The polyisocyanates described above can be used in this particular process. However, those which have more than two isocyanate groups of the type formed by trimerisation, reaction with water or polyols such as trimethylol propane or triethanol isocyanurate are preferred. Products of this type are commercially available, for example triphenyl methane-4',4'',4''-triisocyanate (Desmodur R), the biuret from hexamethylene diisocyanate and water (Desmodur N), or the adduct of toluylene diisocyanate and trimethylol propane (Desmodur L). It is often desirable for basic amino groups to be present in the molecule in order to improve the stability of the bath, and they may be introduced therein by bonding two or more polyisocyanates with amino alcohols. Polyols containing amino groups are preferred as the amino alcohols. Examples of these are ethanol amine, N-methyl diethanolamine and thriethanol amine, or polyols containing ketimine groups which are produced by the condensation of 2-amino-2-ethyl-1,3-propane diol, N-[2-hydroxyethyl]-ethylene diamine or N,N-bis[2-hydroxy ethyl]-ethylene diamine with ketones such as methyl isobutyl ketone.

The polyisocyanate is reacted with hydroxy carboxylic acid esters or amino carboxylic acid esters in stoichiometric ratios at temperatures of from about 30° to 100° C. In order to prevent any uncontrolled reaction of the isocyanate group, the process is carried out in the absence of both moisture and atmospheric oxygen, and moreover the functionality of the polyisocyanate is reduced by initially performing the reaction with the hydroxy alkyl and/or amino alkyl carboxylic acid esters, and then bonding the residual isocyanate groups by means of a polyalcohol containing amino groups. The slow addition of the polyisocyanate into the solution of hydroxyl alkyl and/or amino alkyl carboxylic acid esters and a polyalcohol containing amino groups, in a low-boiling inert solvent such as ethylacetate which is later distilled off, has proved to be another suitable mode of operation. Small amounts of the amino alkyl and/or hydroxy alkyl carboxylic acid ester can be exchanged in a molar ratio for longer chained amines such as, for example, diethyl hexylamine or alcohols, for example ethyl hexanol, in order to reduce the reactivity and simultaneously the elasticization. Dimethylol propionic acid methyl ester, lactic acid ethyl ester, hydroxy acetic acid butyl ester or salicylic acid methyl ester, for example, are used as the hydroxy carboxylic acid ester. Sarcosinic acid ethyl ether or anthranilic acid methyl ester, for example, can be used as the amino carboxylic acid ester.

The resins containing epoxy groups described above are suitable as polyepoxy resins which are particularly preferably reacted with amino alkyl carboxylic acid esters and/or dicarboxylic acid monoalkyl esters. At least two, and preferably more than two, epoxy groups are present in the molecule. The monoesters are produced from saturated or unsaturated dicarboxylic acid anhydrides such as maleic acid anhydride, succinic acid anhydride, and tetrahydrophthalic acid anhydride, or $C_1$ to $C_6$ linear or branched, saturated or unsaturated monoalcohols, preferably methanol and/or ethanol. A small excess of the alcohol used increases the stability of the monoester obtained therefrom. If possible, the reaction temperature should be kept below 120° C., preferably below 100° C., both during the production of the ester and also during the addition to the epoxy resin, in order that ester interchange may be prevented. Amino groups are preferably introduced by the proportional incorporation of secondary monoamines such as diethyl amine, N-methyl ethanol amine or diethanol amine, or two or more epoxy resin molecules bonded by means of primary amines such as N-butyl amine or monoethanol amine, or else by means of diamines having secondary amino groups.

Components A and B are preferably combined in such a way that they are mixed as concentrates, are then neutralized together, and are subsequently gradually diluted with water. It is preferable for the equivalence ratio of the sum of primary and/or secondary amino groups of component A (and B) to the esterified carboxyl group(s) of component B to be in the range of from 1:5 to 1:0.1, preferably in the range of from 1:3 to 1:1. A stoichiometric equivalence ratio is particularly preferably desired.

The various types of base resin containing amino groups (component A) can either be used singly or as a mixture of several types, with the relevant cross-linking agent. It may be necessary, for example, to balance the mechanical and electrical properties in such a way that an epoxy amine resin containing amino groups is mixed with a polyamine amide resin. In addition, it is preferably for balancing out the properties in terms of actual application to emulsify other modifying resins in a small amount (in addition to the cross-linking agents described) into the cathodically depositable binder. Maleic resins, styrene allyl alcohol copolymers, acrylic copolymers containing OH-groups, epicote esters containing OH-groups and blocked isocyanates, as well as amine and phenol formaldehyde resins can be used in this connection. In order to prevent precipitation, not more than 20% by weight, preferably below 10% by weight of the additional modifying resins, should be emulsified into the binder and either a higher OH number of from about 100 to 250 or a smaller proportion of basic amino groups (amino value below about 60, preferably below 40) should be present so as to improve the emulsifiability thereof.

The water solublity of the binder is obtained by salt formation of the resins containing amino groups with acidic compounds. Hydrochloric acid, acetic acid, lactic acid, malonic acid, citric acid, formic acid, acrylic acid etc, for example, are suitable for this purpose. It is also possible to produce cationic resins which act as binders and which can be diluted with water by adding to the basic resin 0.2 to 1.2 equivalents preferably 0.4 to 1.0 equivalents of the protonising acid, based on the basic nitrogen atom in the resin, and then stirring the mixture thoroughly at temperatures of from about 20° to 90° C. Disturbing solvents which are carried over from the production of the resins are distilled off under vacuum, preferably after the hydrolytic decomposition of the ketimine. The coating composition of the present invention can contain up to about 20% by weight of organic solvents in order to reduce the viscosity thereof, to control the deposition voltage needed and also to improve the course of deposition. Water-soluble solvents such as alcohols, glycols ethers, ketoalcohols or small amounts of non-water soluble solvents such as hydrocarbons of differing chain length can be used in this process. A minimal content of organic solvents is desirous.

The solids contents of the deposition bath in which the coating composition according to the present invention is contained in dilute form advantageously amounts to from 5 to 30% by weight, preferably from 10 to 20% by weight, after dilution with water. The pH value of the bath generally lies between 4.5 and 7.5 and preferably lies between 5.5 and 7.0. The electrophoretic deposition preferably takes place 24 hours after the production of the bath at the earliest. The mixture is preferably stirred continuously during this period in order that a completely uniform distribution is obtained in the bath. Electrically conductive and non-corrosive electrodes made, for example, of stainless steel or graphite, are used as the anode. The article which is to be coated cathodicaly and also the anode are immersed into an aqueous bath in the same way as has been known hiterto for electrophoretic deposition. The bath is preferably kept at a temperature of from 20° to 35° C. during deposition. Solids content, deposition temperature, deposition time and the voltage used are selected in such a way that the desired thickness of layer is obtained on the sheet metal after rinsing and stoving.

Setting of the layer takes place as a result of stoving for from 15 minutes to 1 hour at from 140° to 210° C., preferably at from 160° to 180° C. The stoving temperature can be lowered or the completion of the reaction can be accelerated by working in, for example, 0.05 to 3% by weight of ester interchange catalysts. Ammonium compounds such as benzyl trimethyl ammonium hydroxide, organic tim compounds such as dibutyl tin dilaturate, titanium complexes such as butyl titanate or triethanol amine titanate, iron-III-acetyl acetonte, zinc acetate, lead acetate, cerium-III-acetate, antimony trioxide and cobalt naphthenate can typically be used as catalysts.

The concentrated coating composition according to the present invention which generally has a solids composition of from 85 to 60% by weight and which is to be diluted with water, can be pigmented in a conventional manner using a ball mill, three roller mill or sand mill. Conventional pigments, fillers, corrosion inhibitors and lacquer auxiliaries such as antifoaming agents can be used for pigmenting, provided that they do not enter into any reactions with water in the acidic to neutral pH value which are liable to effect the system as a whole, do not carry over any water-soluble foreign ions and furthermore do not precipitate upon ageing. The lacquer coating compositions of the present invention are particularly suitable for the electro-dip lacquering of metals, and they produce smooth, lustrous, hard films having good adhesiveness and elasticity as well as particularly good corrosion-resistance after stoving for 30 minutes at 180° C. The pigment to binder ratio is dependent upon the viscosity of the binder, and generally lies between 0.1:1 and 1.5:1.

The present invention is further illustrated by the following specific Examples which should not be construed as limiting the invention to the specific procedures set forth therein.

Cross linking agent A 596.6 g of an aliphatic triisocyanate containing biuret groups, and based on hexamethylene diisocyanate, is dissolved in 96 g of water-free ethyl glycol acetate and is then heated to 80° C. 236 g of lactic acid ethyl ester are subsequently added dropwise over a period of 25 minutes, and the mixture is kept at 80° C. for 30 minutes after which time 59 g of methyl diethanol amine is added over a period of 10 minutes. The mixture is transferred after 2 hours at 80° C. Solids composition: about 90% by weight Ester value (calculated)=130 mg KOH/g solid resin Amine value=32 mg KOH/g solid resin Cross linking agent B 594 g of triglycidyl isocyanurate is melted at 90° to 95° C. 500 g of a 95% succinic acid monomethyl ester solution in methanol is then added dropwise thereto over a period of 30 minutes. The mixture is first stirred at 95° to 100° C. and then at 120° C. until the acid number lies below 0.5. After dilution with 100 g of butyl glycol, 65 g of n-butyl amine is slowly added at 60° to 80° C. with cooling. The mixture is then stirred for a further two hours and is thereafter diluted with secondary butanol to a solids content of 75% by weight. Ester value (calculated)=178 mg KOH/g solid resin Amine value=39 mg KOH/g solid resin

EXAMPLE 1

Base Resin 1394 g of polyglycidyl ether based on bisphenol A and having an epoxy equivalent weight of 475 is dissolved in 465 g of methylisobutylketone and the solution is heated to 125° C. with the addition of 1.4 g of triphenylphosphine and 174 g lactic acid (80% pure). The reaction water is circulated out until an acid number of 0.2 is obtained. The mixture is then cooled to 80° C., and a mixture of 65.1 g of monomethyl ethanolamine and 116.2 g of methylaminopropylamine methylisobutylketimine is allowed to enter the mixture over a period of 5 to 10 minutes, the temperature rising to about 120° C. The mixture is kept at this temperature for about 2 hours and is then cooled to 95° C. The amine value equals 75 mg KOH/g of solid resin and the $pk_b$-value is about 4.9 at this stage. 24.6 g of water and 93.4 g of lactic acid (80% pure) are then added, hydrolysed for 2 hours at 95° C. and the resulting methylisobutylketone is distilled off. The mixture is then diluted with 165 g of butylglycol and 940 g of distilled or deionised water to about 60% solids content by weight.

Solids content: 62.8% by weight (heated for 40 minutes at 180° C. in a circulation drying cabinet)

MEQ acid: 52.9 (milliequivalents acid to 100 g solid composition)

Deposition bath 255 g of base resin is heated to about 50° C. and mixed in succession with 44.5 g cross-linking agent A and 2.3 g lactic acid (80% pure). The mixture is then gradually diluted to a solids content of about 10% by weight with 1697 g of distilled or de-ionised water.

MEQ acid: 63
pH-value: 6.6
conductivity: 1450 $\mu Scm^{-1}$

The films were deposited for 2 minutes at a bath temperature of 30° C., rinsed with water, and then stoved for 25 minutes at 190° C., eliminated ethanol being detected in the vapour chamber. The eliminated reaction products are determined in such a way that the electrophoretically deposited film is pre-dried and weighed out for 1 hour at 100° C. The loss in the weight which also occurred thereafter under the stoving conditions selected is then given as cleavage product in percent from the deposited material. The following properties of the film were then measured:

Cleavage products 3.4%
König pendulum hardness (DIN 53 157) 192 seconds/204 seconds
Erichsen deep-drawing (DIN 53 156) 1.5 to 2.00 mm
Salt spray mist test (DIN 53 167) on polished sheet metal after 96 hours:

| 80 Volt/15 μm | 90 Volt/20 μm |
| --- | --- |

| -continued | | |
|---|---|---|
| Surface rust | 2 | 1–2 |
| Under-travelling | 3–6 mm | 3–6 mm |
| On 127 bonder (unground side) after 240 hours: | | |
| | 150 Volt/15 μm | 280 Volt/20 μm |
| Surface rust | 2–3 | 3 |
| Under-travel | 3–5 mm | 2–3 mm |

EXAMPLE 2

Base Resin 200 g of methylisobutylketone is heated in a reaction flask fitted with a reflux condenser, and any water present is circulated out. A solution of
- 361 g n-butylacrylate,
- 191 g styrene,
- 95 g glycidylmethacrylate,
- 231 g hydroxypropylmethacrylate,
- 1 g triphenylphosphine,
- 20 g azo-bis-isobutyric acid nitrile, and
- 100 g methylisobutylketone is then added over 3 hours, during which time the temperature should not exceed 117° C. A further 5 g of azo-bis-isobutyric acid nitrile is added after a further 30 minutes, and the temperature is maintained for a further hour with stirring. The mixture is then cooled to 80° C., and 142 g of a 70% solution of methylaminopropylamine methylisobutylketimine in methylisobutylketone are added over a period of 10 minutes. The mixture is subsequently kept at 80° C. for 1 hour, and 4 ml of diethyl amine and 382 g of butylglycol are then added in succession. 302 g of solvent are then distilled off under vacuum, and the mixture is adjusted to a 70% solids content using secondary butanol.

Solids content: 69.2% by weight (40 minutes 180° C.)
amine value: 67 mg KOH/g solid resin
viscosity: 3089 mPas (50% in butylglycol at 25° C.)
$pk_b$-value: about 3.8

Deposition bath 231 g base resin is heated to about 50° C. and successively mixed with 44.5 g of cross-linking agent A and 6 g of glacial acetic acid. The mixture is gradually diluted to a solids content of about 10% by weight with 1718 g of de-ionised water.

Cleavage products: 4.3 by weight
MEQ acid: 64
pH-value: 6.8
conductivity: 1450 μScm$^{-1}$ A dry film thickness of 20 μm is deposited at 30° C. after 2 minutes at 120 volts. The following values were measured on the smooth-run film after 25 minutes heating at 175° C.:

König pendulum hardness (DIN 53 157) 84 seconds/76 seconds
Erichsen deep-drawing (DIN 53 167) 8.8 mm

EXAMPLE 3

Base Resin 1316 g of a 75% xylene solution of a polyglycidyl ether having a epoxy equivalent weight of 493 and based on bisphenol A, 2 g of triphenylphosphine, 134 g of trimethylolpropane and 526 g of N,N'-diglycidyl-5,5-dimethylhydantoin are heated to about 150° C. in order to circulate out water. This temperature is maintained until the epoxy equivalent weight of the solution amounts to 564. After cooling to 60° C., a solution of 395 g of monoethanolamine methyl isobutylketimine and 1.5 g of boronfluoride etherate in 99 g of methylisobutylketone are added dropwise over a period of 30 minutes. The temperature is then raised to 120° C. in about 4 hours. After this time the mixture is cooled to 40° C. and 29 g of diethylamine are added. 49 g of water and 220 g of butylglycol are added 1 hour later. The solvent and the amin radicals are distilled off at temperatures of up to 110° C. at reduced pressure. The mixture is then diluted to a solids content of 72.3% by weight with secondary butanol.

Amine value: 87 mg KOH/g solid resin
Viscosity: 10.8 Pas (after dilution to 60% by weight with secondary butanol at 25° C.)

Deposition bath 10.0 g of a polyamino amide resin having an amine value of 90 and a viscosity of about 100 Pas at 75° C. is dissolved in 194 g of base resin with careful heating. 60 g of cross-linking agent A and 6 g of acetic acid are then added successively. The mixture is gradually diluted to a solids content of about 10% by weight with 1730 g distilled or de-ionised water.

MEQ: 50
pH-value: 6.95
Conductivity: 1760 μScm$^{-1}$

The films were deposited on Bonder 127 for 2 minutes at a bath temperature of 30° C., rinsed with water and then stoved for 25 minutes at 180° C.

Cleavage products: 3.8% by weight
König pendulum hardness (DIN 53 157) 207 seconds/211 seconds
deposition voltage: 100 volts for 17–19 μm dry film thickness

EXAMPLE 4

Base Resin 1316 g of a 75% xylene solution of a polyglycidyl ether having an epoxy equivalent weight of 493 and based on bisphenol A, 2 g of triphenylphosphine, 118 g of hexane diol-1,6- and 297 g of triglycidyl isocyanurate are heated to about 150° C. in order to circulate out water. This temperature is maintained until the epoxy equivalent weight of the solution amounts to 559. A solution of 395 g of monoethanolamine methylisobutylketimine and 4.9 g of N,N-dimethylbenzylamine in 99 g of methylisobutylketone are added dropwise over 30 minutes after cooling to 55° C. The temperature is then increased to 120° C. in about 4 hours. After this time, the mixture is cooled to 80° C., and 29 g of diethylamine are added. 49 g of water and 454 g of butylglycol are added 1 hour later. Xylene, methylisobutylketone and amine radicals are distilled off at a temperature of 110° C. at reduced pressure and are subsequently diluted with secondary butanol to a solids content of 68.0% by weight.

Amine value: 104 mg KOH/g solid resin
viscosity: 16.8 Pas (after dilution to 60% by weight with methylglycol at 25° C.)

Deposition bath 10 g of a polyaminoamide resin having an amine value of 90 and a viscosity of about 100 Pas at 75° C. is dissolved in 206 g of base resin with careful heating. 60 g of cross-linking agent A and 6 g of acetic acid are added in succession. The mixture is then gradually diluted to a solids content of about 10% by weight with 1718 g of distilled or de-ionised water.

MEQ acid: 50
pH-value: 7.0
conductivity: 1670° Scm$^{-1}$

The films were deposited on Bonder 127 for 2 minutes at a bath temperature of 30° C., rinsed with water and then stove for 25 minutes at 180° C.

Cleavage products: 3.7% by weight

König pendulum hardness (DIN 53 157) 213 seconds/211 seconds deposition voltage: 100 volt for 18-20 μm dry film thickness

EXAMPLE 5

Base Resin 430 g of commercial xylene, 2 g of triphenylphosphine, 102 g of versatic acid 10 and 1300 g of a polyglycidyl ether based on bisphenyl A and having an epoxy equivalent weight of 650 are heated to about 150° C. under a nitrogen atmosphere to circulate out water. This temperature is maintained until the acid number is zero. The hot solution is then slowly added to a solution of 255 g of ethylene diamine in 450 g of n-butanol, the temperature rising to about 90° C. 3 hours after addition, all solvent and excess amine are carefully distilled off under reduced pressure at 150° C. The mixture is then diluted to a solids content of 70.9% by weight using butylglycol and secondary butanol (1:3).

Amine value: 94 mg KOH/g solid resin

Viscosity: 6.5 Pas (after dilution to 60% by weight with butylglycol at 25° C.)

Deposition bath 10 g of a polyamino amide resin having an amine value of 90 and a viscosity of about 100 Pas is dissolved in 40 g of butylglycol at 75° C. and then mixed with 197 g of base resin and 50 g of cross-linking agent B. After addition of 7.2 g of acetic acid, the mixture is gradually diluted to a solids content of 10% by weight using 1695 g of distilled or de-ionised water.

MEQ acid: 60 pH-value: 6.3 conductivity: 1480 μScm$^{-1}$

The films were deposited on Bonder 127 for 2 minutes at a bath temperature of 30° C., rinsed with water and then stoved for 25 minutes at 160° C.

cleavage products: 4.0% by weight deposition voltage: 130 volts for 18-19 μm dry film thickness König pendulum hardness (DIN 53 157) 227 seconds/227 seconds.

EXAMPLE 6

Precondensate 2591 g of pivalinic acid neopentyl glycol ester is melted and added to 1405 g of iosphthalic acid. The temperature is increased sufficiently to distill off water under an inert gas atmosphere with stirring. After reaching an acid number of about 10, 2.3 g of antimony oxide and 2.2 g of zinc acetate are added as a catalyst. The mixture is kept at a maximum temperature of 240° C. until the acid number amounts to 0.5, and the mixture is then diluted to a solids content of 60% by weigh using ethyl acetate.

Base resin 930 g of a biuret composed of hexamethylene diisocyanate and water (Desmodur N) is added to 1186 g of the above precondensate. 160 g of ethyl hexyl alcohol are added after an NCO content of 8.4% is reached. The mixture is maintained at 80° C. until an NCO content of 3.8% is reached, and after this time is diluted with 795 g of ethylacetate. This warm solution is subsequently added over a period of about 1.5 hours to 390 g of a 67.7% solution of methyl amino propyl amine methyl isobutyl ketimine in methyl isobutyl ketone, the temperature being maintained at about 40° C. by periodic cooling. 23.8 g of diethylamine is then added, the mixture is heated to 75° C. in 2 hours and 696 g of butyl glycol is then stirred in. Ethyl acetate and amine radicals are then distilled off under vacuum at temperatures of 80° C.

Amine value: 50 mg KOH/g solid resin

Solids content: 74.7% by weight (after 40 minutes stoving at 180° C. in a circulation drying cabinet).

Deposition bath 214 g of base resin is mixed with 60 g of cross-linking agent A and 7.2 g of acetic acid in succession.

The mixture is then gradually diluted to a solids content of about 10% by weight using 1719 g distilled or de-ionized water.

MEQ-acid: 60 pH value: 7.1

Conductivity: 1600 μScm$^{-1}$

A dry film thickness of 20 μm is deposited on Bonder 127 at 30° C. after 2 minutes at 200 volts. After heating to 160° C. for 25 minutes, a smooth-running, lustrous film with great hardness and good bending elasticity is obtained.

What is claimed is:

1. A cathodically depositable aqueous electrodipping coating composition comprising a binder dilutable in water by protonization with acids, said binder consisting essentially of:
   (a) 55 to 95% by weight, based on the total weight of binder being a reaction product of the resin having at least one isocyanate per molecule and a compound selected from the group consisting of polyamines, ketimines containing amino groups, ketimines containing hydroxyl groups and ketimines containing amino and hydroxyl groups and said reaction product having an average molecular weight (Mn) of about 500 to about 10,000, a pk$_b$ value of about 3 to about 7, and containing amino groups selected from the group consisting of primary, secondary and tertiary amino groups to an amine value of about 30 to about 150; and
   (b) 45 to 5% by weight, based on the total weight of the binder, of a cross-linking agent being a reaction product of an hydroxy and/or amino alkyl carboxylic acid ester with a polyisocyanate selected from the group consisting of aliphatic, cycloaliphatic and aromatic polyisocyanates and mixtures thereof, said cross-linking agent having an average molecular weight (Mn) of about 500 to about 5000 and containing terminal carboxyl groups, a sufficient number of which are esterified with monoalcohols containing from 1 to 6 carbon atoms to prevent the cross-linking agent from travelling to the anode during electro-deposition and to provide the cross-linking agent with an ester value of about 30 to about 350, the ester groups being substantially stable in a neutral aqueous medium but being reactive in a basic medium at a temperature above 140° C. with amino groups selected from the group consisting of primary and secondary amino groups which are present in the organic synthetic resin binder.

2. A coating composition as set forth in claim 1 wherein the cross-linking agent has an ester value of about 100 to about 250.

3. A coating composition as set forth in claim 1 wherein the organic synthetic resin binder has a pk$_b$ value of about 3 to about 5.5 and the ester groups of the cross-linking agent are reactive in a basic medium at a temperature above 160° C.

4. A coating composition as set forth in claim 1 wherein the equivalent ratio between amino groups selected from the group consisting of primary and secondary amino groups of the organic synthetic resin binder to carboxyl groups and esterified carboxyl groups is from about 1:5 to 1:0.1.

5. A coating composition as set forth in claim 4 wherein the ratio is from about 1:3 to 1:1.

6. A coating composition as set forth in claim 4 wherein the ratio is about 1:1.

7. A coating composition as set forth in claim 1 wherein the organic synthetic resin binder is a reaction product of a polymer containing at least two isocyanate groups with an alkyl ketimine containing amino groups.

8. A coating composition as set forth in claim 1 wherein substantially all of the terminal carboxyl groups of the cross-linking agent are esterified.

9. A coating composition as set forth in claim 1 wherein the terminal carboxyl groups of the cross-linking agent are esterified with primary alcohols having a boiling point of below about 140° C.

10. A coating composition as set forth in claim 1 wherein the cross-linking agent has an amine value of up to about 60.

11. A coating composition as set forth in claim 1 wherein the cross-linking agent has an amine value of from about 10 to about 50.

12. A coating composition as set forth in claim 1 wherein the cross-linking agent is an addition product of a resin containing isocyanate groups and esters selected from the group consisting of hydroxyalkyl esters, aminoalkyl esters.

13. A coating composition as set forth in claim 1 wherein the cross-linking agent is the reaction product of a dicarboxylic acid monoalkyl ester with a resin selected from the group consisting of epoxy containing resins and hydroxyl containing resins.

14. A coating composition as set forth in claim 1 wherein the cross-linking agent is the reaction product of a dicarboxylic acid monoalkyl ester with an epoxy resin containing hydroxy groups.

15. A coating composition as set forth in claim 1 which additionally comprises pigments, fillers, corrosion inhibitors, lacquer auxiliaries, catalysts and organic solvents in a quantity of up to 15% by weight, based on the total weight of the coating composition.

16. A cathodically depositable aqueous electrodipping coating composition comprising a binder dilutable in water by protonization with acids, said binder consisting essentially of:

(a) 55 to 95% by weight, based on the total weight of binder of an organic synthetic resin binder being a reaction product of a resin having at least one 1,2-epoxy group per molecule and a compound selected from the group consisting of polyamines, ketimines containing amino groups, ketimines containing hydroxyl groups and ketimines containing amino and hydroxyl groups and having an average molecular weight (Mn) of about 500 to about 10,000, a $pk_b$ value of about 3 to about 7, and containing amino groups selected from the group consisting of primary, secondary and tertiary amino groups to an amine value of about 30 to about 150; and (b) 45 to 5% by weight, based on the total weight of the binder, of a cross-linking agent being a reaction product of an hydroxy and/or amino alkyl carboxylic acid ester with a polyisocyanate selected from the group consisting of aliphatic, cycloaliphatic and aromatic polyisocyanates and mixtures thereof and having an average molecular weight (Mn) of about 500 to about 5000 and containing terminal carboxyl groups, a sufficient number of which are esterified with monoalcohols containing from 1 to 6 carbon atoms to prevent the cross-linking agent from travelling to the anode during electro-deposition and to provide the cross-linking agent with an ester value of about 30 to about 350, the ester groups being substantially stable in a neutral aqueous medium but being reactive in a basic medium at a temperature above 140° C. with amino groups selected from the group consisting of primary and secondary amino groups which are present in the organic synthetic resin binder.

* * * * *